May 16, 1967
G. M. RAPATA
3,319,918
SHOCK MOUNTING GROMMET
Filed June 18, 1965
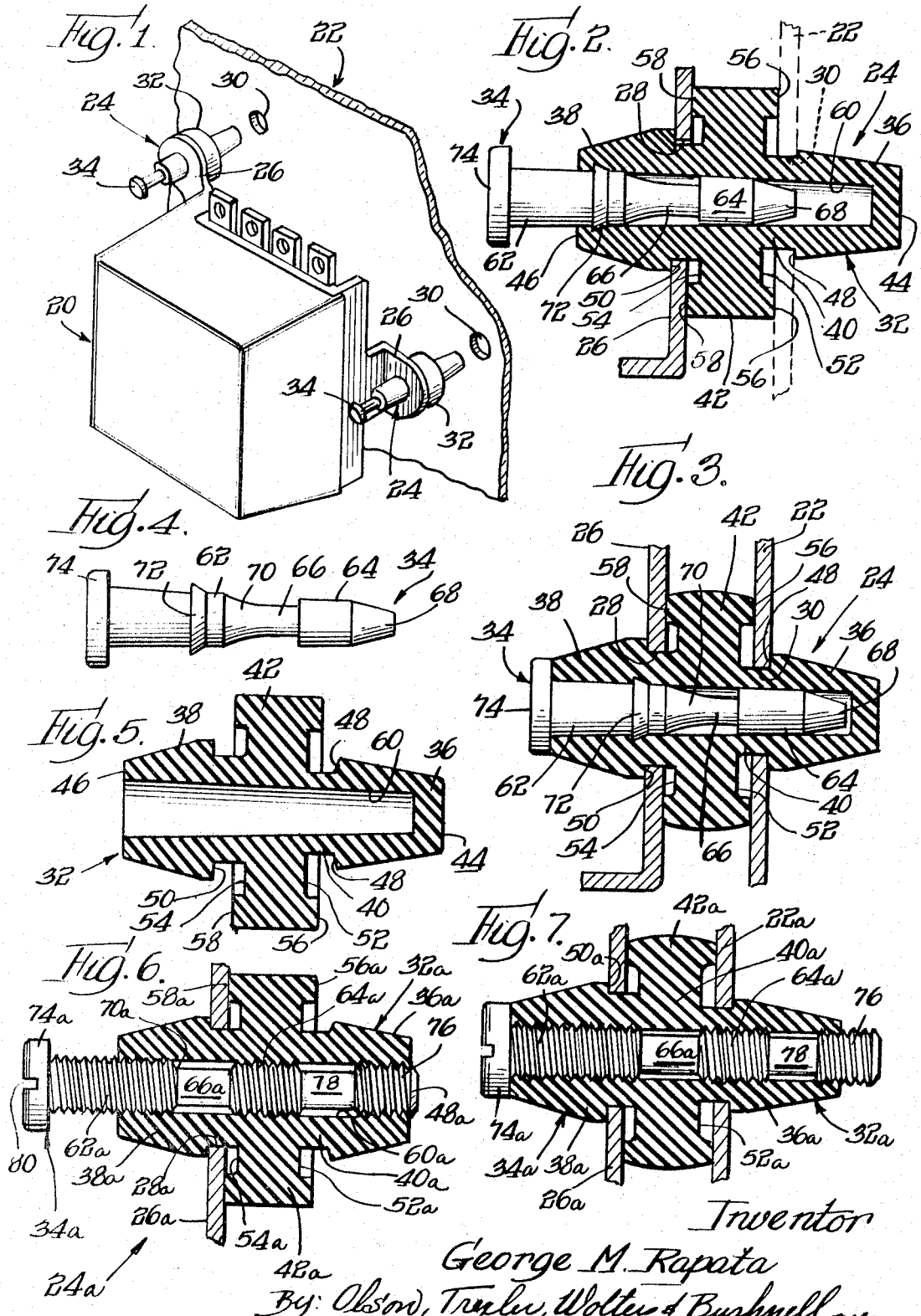
Inventor
George M. Rapata
By: Olson, Trexler, Wolters & Bushnell attys.

United States Patent Office 3,319,918
Patented May 16, 1967

3,319,918
SHOCK MOUNTING GROMMET
George M. Rapata, Park Ridge, Ill., assignor to Illinois Tool Works Inc., Chicago, Ill., a corporation of Delaware
Filed June 18, 1965, Ser. No. 464,939
6 Claims. (Cl. 248—239)

This invention relates generally to panel mounting devices and especially to such devices that are arranged to absorb mechanical energy and prevent the transmission of noise and vibration.

Devices for mounting various appliances to panels of numerous sorts have been produced in the past. However, these prior art, panel mounting devices have not always proved easy to assemble to the panel and the mounted appliance or have been beset with other shortcomings.

Therefore, a general object of the present invention is to provide a new and improved panel mounting device.

Another object of the invention is to provide a panel mounting device which is easy to assemble to a pair of spaced walls or panels.

Still another object of the invention is to provide a panel mounting device which is characterized by its security of fastening.

Yet another object of the invention is to provide a highly resilient, shock absorbing mounting for attaching various appliances to a panel.

A further object of the invention is to provide a panel mounting device which combines desirable features to a degree not found heretofore.

These and other objects and features of the invention will become more apparent from a consideration of the following descriptions.

In order that the principles of the invention may be readily understood, several embodiments thereof applied to the mounting of an automotive voltage regulator but to which the application is not to be restricted, are shown in the accompanying drawing wherein:

FIG. 1 is a perspective view showing the mounting of an automotive voltage regulator to an engine compartment panel using mounting devices constructed in compliance with the present invention;

FIG. 2 is an enlarged, side elevational view in cross-section showing a pre-assembled mounting device of FIG. 1 in ready position for achieving attachment to a panel that is suggested in broken outline;

FIG. 3 is a view similar to the showing of FIG. 2 but illustrating the mounting device in its completely assembled and mounted condition;

FIG. 4 is a side elevational view of the pin member used in the mounting device of FIGS. 2 and 3;

FIG. 5 is a side elevational view in cross-section of the grommet member used in the mounting device of FIGS. 2 and 3;

FIG. 6 is a side elevational view in cross-section of a modified panel mounting device constructed in accord with the invention and shown in pre-assembled condition ready for attachment to a panel; and FIG. 7 is a view similar to the showing of FIG. 6 but illustrating the modified mounting device in its completely assembled and mounted condition.

Referring now in detail to the drawing, specifically to FIG. 1, a voltage regulator 20 is shown in position ready to be mounted to a firewall 22 by means of two panel mounting devices 24 that are constructed in compliance with the present invention. It is to be recognized that appliances other than voltage regulators may be mounted by means of the devices 24; and even in the case of voltage regulators, the attachment may be to a side panel of the engine compartment as well as to the firewall. The mounting devices 24 are specifically arranged for attachment to two spaced plates or panels; and for this purpose, the voltage regulator 20 is fabricated with laterally outwardly extending flanges or ears 26 which are perforated with circular holes 28, as is shown in FIG. 2, whereby to cooperate with the panel mounting devices 24. Correspondingly, the firewall 22 is apertured with circular holes 30 for use in mounting the voltage regulator using the devices 24.

Each of the mounting devices 24 includes a unitary grommet member 32 and a pin member 34; and continuing with reference to FIGS. 2-5, the grommet member 32 comprises a leading end portion 36, a trailing end portion 38, a medial portion 40 and a flange portion 42. The end portions 36 and 38 taper conically in opposite directions to tips 44 and 46 respectively, and these tips serve to lead the grommet member into assembled relationship with the circular holes formed in the panels to be interconnected. Additionally, the medial portion 40 is of lesser radial extent than the end portions 36 and 38 in order to reside fittingly in the apertures of the respective panels as is shown and suggested in FIGS. 2 and 3. Advantageously, the end portions 36 and 38 terminate in annular abutment shoulders 48 and 50 which confront each other and which serve as stops for the respective panels in the assembled condition therewith. The flange portion 42 radiates from the medial portion 40 spaced axially from the shoulders 48 and 50 in order to engage and abut the spaced panels and to define a shock mounting base therebetween. The flange portion 42, and indeed the entire grommet member 32, is fabricated from a soft, resilient material; and the functioning of the flange portion 42 as a shock absorbing base is promoted by the fashioning of annular grooves 52 and 54 to open from the opposite lateral faces of the flange portion. The grooves 52 and 54 serve to define marginal abutment surfaces 56 and 58 respectively, and these abutment surfaces are adapted to contact the spaced panel members to which the mounting device 24 is intended to be assembled. A central, pin receiving bore 60 penetrates the body of grommet member 32 and opens from the trailing end portion 38. As is shown in FIG. 5, the bore 60 may taper from a larger diameter at the trailing end portion 38 to a narrower diameter at the leading end portion 36. The bore 60 may also take a cylindrical or a shouldered shape if desired.

With particular reference to FIG. 4 and with secondary reference to FIGS. 2 and 3, the pin member 34 which is intended for assembly into the bore 60 is fabricated to include axially aligned and spaced plug portions 62 and 64 which are sized diametrically to expand the medial portion 40 of grommet member 32 in the vicinity of the annular shoulders 48 and 50 adjacent the junctures of the medial portion with the end portions 36 and 38. The pin member 34 also comprises a transversely reduced portion 66 generally disposed between the plug portions 62 and 64, the transversely reduced portion 66 allowing the shank of end portion 38 to collapse for preassembly and serving to promote flexing of the medial portion 40 of grommet 32 in the use condition thereof. Advantageously, the pin member 34 is fashioned with a conically tapered tip 68 and a conically tapered wall 70 that leads from the transversely reduced portion 66 to the plug portion 62, tip 68 and wall 70 serving to lead the pin member into the bore 60. In compliance with the present invention, an annular frusto-conical shoulder 72 is raised radially outwardly from the plug portion 62, shoulder 72 tapering toward a major dimension which faces a head 74 that is formed on the trailing end of plug portion 62. Thus, the shoulder 72 defines means for aggressively engaging the wall of bore 60 to retain the pin member in assembled condition relative to the bore. Additional retention rings similar to the annular shoulder 72 may be provided at other locations on the pin member, and it is recognized that the head 74 may be flat or countersunk as is desired.

Use of the panel mounting device 24 is illustrated in FIGS. 2 and 3. In the former figure, the grommet member 32 and the pin member 34 are shown pre-assembled together and to the panel element that is defined by an ear 26 of the voltage regulator. Specifically, the trailing end portion 38 of the grommet member has been urged through the circular hole 28 in the ear 26 until the edges of the hole reside in alignment with the trailing end of medial portion 40, the shoulder 50 and the abutment surface 58 contacting opposite sides of the panel. Furthermore, the pin member 34 has previously been partially inserted in the bore 60, the plug portion 64 residing in radial alignment with the flange portion 42 of the grommet and the shoulder 72 aggressively engaging the wall of bore 60 in the vicinity of the end portion 38 whereby to retain the pin member in pre-assembled condition.

Completion of the mounting is achieved by urging the leading end portion 36 of the grommet through the circular hole 30 fashioned in firewall 22, the edges of the hole 30 eventually residing in alignment with the leading end of medial portion 40 where opposite sides of the firewall are engaged respectively by the shoulder 48 and the abutment surface 56. Finally, the pin member 34 is driven home into the position shown in FIG. 3. There, the head 74 snugly engages the tip of end portion 38; and more importantly, the plug portions 62 and 64 reside in radial alignment with the respective trailing and leading ends of medial portion 40 where they expand the medial portion radially outwardly into snug engagement with the edges of the holes 28 and 30. Whereas the plug portions 62 and 64 expand the medial portion of the grommet member radially outwardly for grippingly engaging the circular holes in the two panel members, the transversely reduced portion 66 of pin member 34 is spaced radially inwardly from the walls of the bore 60 in the grommet member so as to permit flexing of the intermediate section of medial portion 40 and the flange member 42.

In compliance with the invention, the grommet member 32 is advantageously fabricated from an elastomeric material, such as neoprene for example; and the pin member 34 is correspondingly made from a more rigid material such as nylon, polypropylene, or the polyformaldehyde resinous material sold under the trade name "Delrin" for example. As will be recognized, other materials may be substituted for these exemplary, illustrative substances.

While a particular embodiment of the invention has been thus far described, it should be understood, of course, that the invention is not limited thereto since many modifications may be made. Therefore and in order to enhance the understanding of the invention, a modified form thereon is illustrated in FIGS. 6 and 7. Because the embodiment of FIGS. 6 and 7 incorporates certain components which are similar to those found in the embodiment of FIGS. 1–5, like numerals have been used to designate like parts with the suffix *a* being employed to distinguish those elements associated with the embodiment of FIGS. 6 and 7.

The panel mounting device 24a, which is shown in FIGS. 6 and 7, is characterized by a number of features. Among these is the elimination of the frusto-conical shoulder which has been indicated by the reference numeral 72 in the embodiment of FIGS. 1–5, the pin member 34a being instead provided with external threads on the plug portions 62a and 64a. These threads act to retain the pin member in the bore 60a of the grommet member 32a. In addition, the bore 60a penetrates completely through the central body of the grommet member, and the pin member is provided with a third axially aligned externally threaded plug portion 76 which is axially separated from the plug portion 64a by a second transversely reduced portion 78. In the pre-assembled condition of the pin member and grommet member, shown in FIG. 6, the transversely reduced portion 78 acts like the tapered tip 68 of the embodiment of FIGS. 1–5 in allowing the shank of the grommet to collapse for assembly to a firewall or other like panel. Because the plug portions of the pin member 34a are threaded, it is advantageous to fashion a transverse slot 80 in the head 74a to provide a tool-engageable formation. In other respects, the construction, function and operation of the panel mounting device 24a is similar to that of the panel mounting 24.

From the foregoing descriptions, it will be apparent that the present invention provides a panel mounting device which is highly resilient whereby to provide an efficient shock absorbing factor. It will additionally be apparent that the panel mounting device of the invention is easy to assemble to a pair of spaced walls or panels. The high degree of security in the mounting achieved by means of the instant invention is also evident from the foregoing descriptions.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

I claim:

1. A panel mounting device comprising: cylindrical grommet means including a first end portion, a second end portion, a medial portion of lesser radial extent than said first and second end portions; flange means radiating from said medial portion spaced axially from said first and second end portions, and a central, pin receiving bore penetrating said end portions and said medial portion; and pin means for assembly in said bore, including axially spaced portions sized to expand said medial portion radially outwardly adjacent its junctures with said end portions and including a transversely reduced portion between said axially spaced portions adapted to promote flexing of portions of said grommet means aligned therewith.

2. A panel mounting device according to claim 1 wherein said pin means further includes means for aggressively engaging the wall of said bore to retain said pin means therein.

3. A panel mounting device according to claim 2 wherein said means for aggressively engaging the wall of said bore comprises an annular frusto-conical shoulder.

4. A panel mounting device according to claim 2 wherein said means for aggressively engaging the wall of said bore comprises thread means.

5. A panel mounting device according to claim 1 wherein said pin means further includes a tapered tip at one end and a head at the opposite end.

6. A panel mounting device comprising: unitary grommet means of expansible material, including a leading end portion tapering to a tip, a trailing end portion tapering to a tip in the opposite direction, a medial portion of lesser radial extent than said end portions whereby to reside in apertures formed in spaced panels in substantially relaxed condition, a central, pin receiving bore penetrating said end portions and said medial portion, and resilient flange means radiating from said medial portion spaced axially from said end portions and adapted to engage spaced panels and to define a shock-mounting base therebetween; and pin means for assembly in said bore, including axially spaced portions sized to expand said medial portion radially outwardly adjacent its junctures with said end portions and including a transversely reduced portion between said axially spaced portions adapted to promote flexing of aligned portions of said grommet means.

References Cited by the Examiner

UNITED STATES PATENTS

| | | | |
|---|---|---|---|
| 2,657,894 | 11/1953 | Sklenar | 248—239 |
| 2,951,674 | 9/1960 | Rice | 248—358 |
| 3,065,342 | 11/1962 | Worden | 85—82 X |

FOREIGN PATENTS

| | | |
|---|---|---|
| 981,909 | 1/1965 | Great Britain. |

JOHN PETO, *Primary Examiner.*